United States Patent [19]
Maguire et al.

[11] Patent Number: 5,380,254
[45] Date of Patent: Jan. 10, 1995

[54] FINISHED FORGED SPROCKET SEGMENT METHOD AND APPARATUS

[75] Inventors: Roy L. Maguire, Edelstein; H. Dale Vick, North Pekin; Billy G. Woodburn, East Peoria, all of Ill.

[73] Assignee: Caterpillar Inc., Peoria, Ill.

[21] Appl. No.: 216,577

[22] Filed: Mar. 22, 1994

Related U.S. Application Data
[62] Division of Ser. No. 954,372, Sep. 30, 1992, abandoned.

[51] Int. Cl.⁶ .............................................. F16H 55/00
[52] U.S. Cl. ..................................... 474/152; 474/162
[58] Field of Search ................ 474/152, 153, 160, 162, 474/95

[56] References Cited

U.S. PATENT DOCUMENTS

| | | | |
|---|---|---|---|
| 2,964,838 | 12/1960 | Schober | 29/159.2 |
| 3,111,859 | 11/1963 | Malone | 74/243 |
| 3,960,412 | 6/1976 | Shuler | 305/57 |
| 4,058,023 | 11/1977 | Smith | 474/162 |
| 4,283,183 | 8/1981 | Janzen et al. | 474/162 |
| 4,420,962 | 12/1983 | Peterson | 72/360 |
| 4,517,819 | 5/1985 | Sandroni | 72/353 |
| 4,555,925 | 12/1985 | Delio et al. | 72/359 |
| 5,026,329 | 6/1991 | Diekevers | 474/162 |

FOREIGN PATENT DOCUMENTS

| | | |
|---|---|---|
| 60-102247 | 6/1985 | Japan. |
| 2-274341 | 11/1990 | Japan. |
| 4-71749 | 3/1992 | Japan. |
| 4-84641 | 3/1992 | Japan. |
| WO88/06931 | 9/1988 | WIPO. |

*Primary Examiner*—Michael Powell Buiz
*Attorney, Agent, or Firm*—Alan J. Hickman

[57] ABSTRACT

A finished toothed sprocket segment is forged in a cavity of a first die by a second die having a protrusion which extends into the cavity. The sprocket segment has first and second spaced datum pads formed on a first curved surface of a rim of the sprocket which locates the sprocket segment on a hub. The first and second datum pads and first and second apertures are located relative to each other so that distortion of the sprocket segment during final heat treatment does not effect the relative position. As a result the apertures in the hub and sprocket segment are easily aligned during attachment of the sprocket segment to the hub. Since the first die requires no draft angles, the critical surfaces on the sprocket segment are forged to final finish, flatness and tolerance.

16 Claims, 3 Drawing Sheets

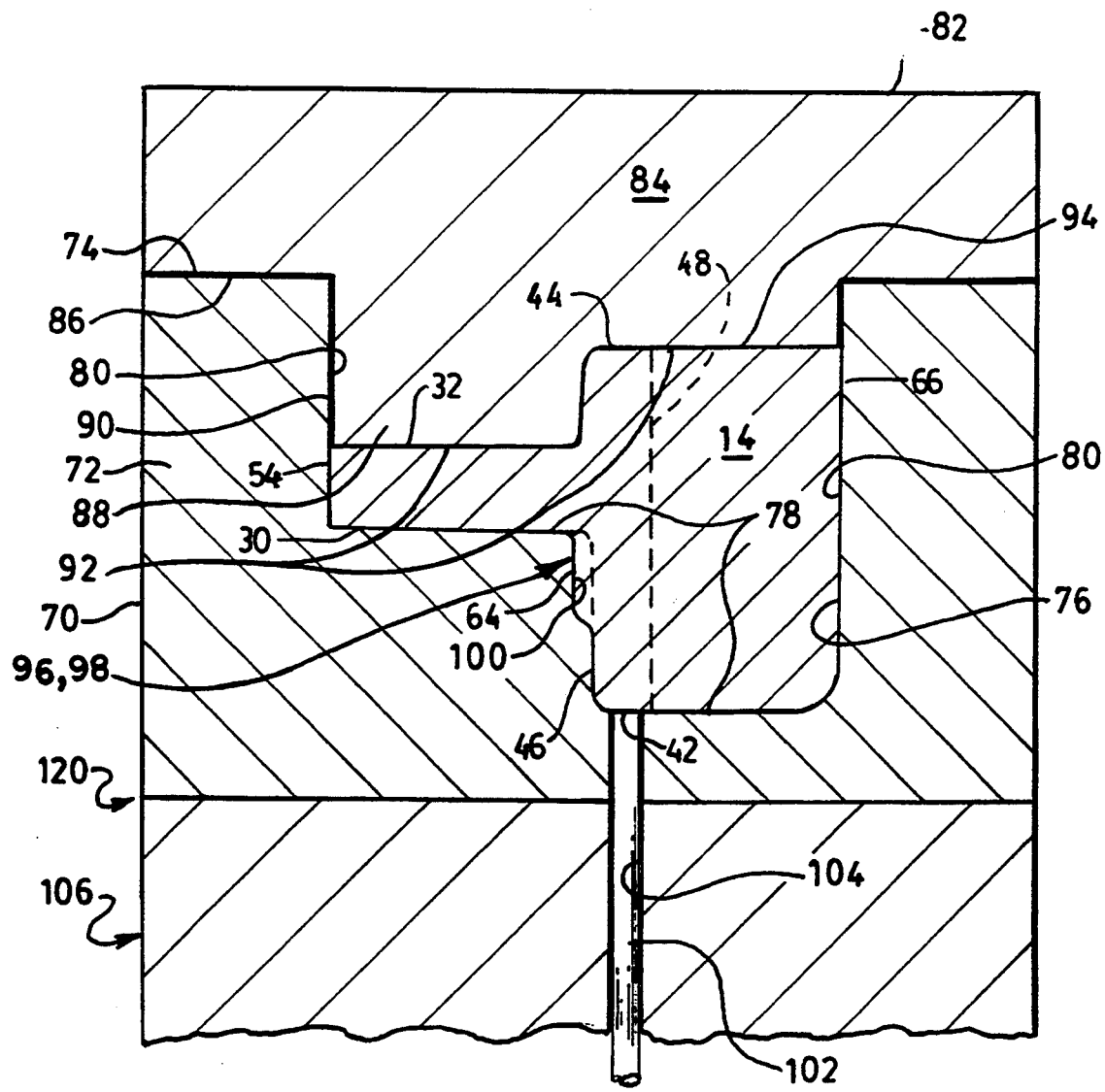

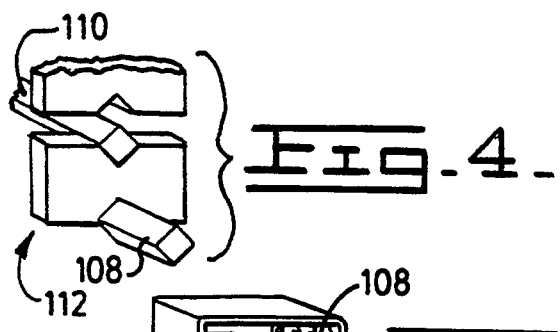
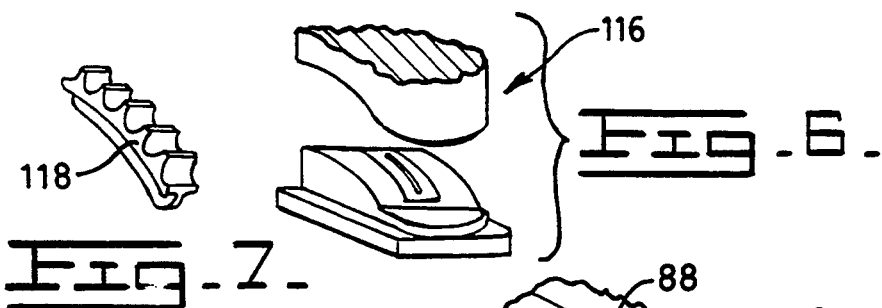
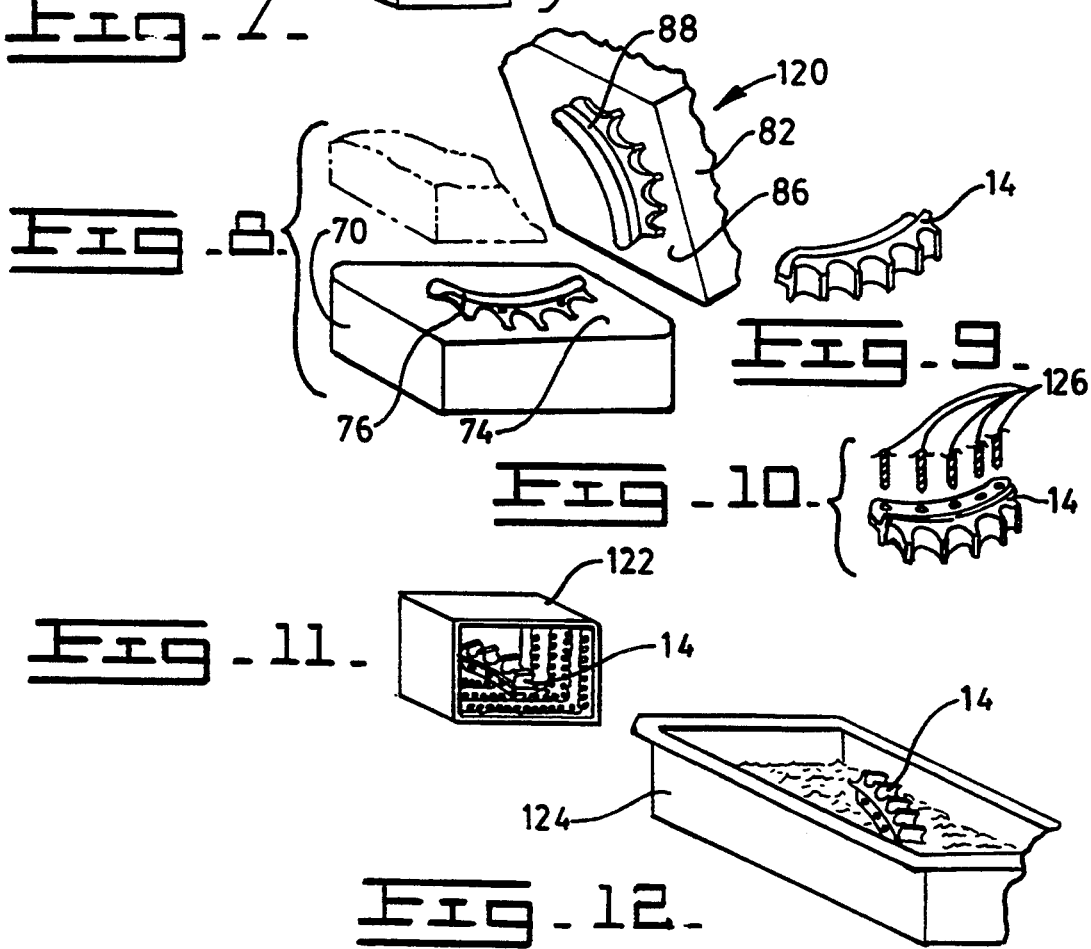

FINISHED FORGED SPROCKET SEGMENT METHOD AND APPARATUS

This application is a divisional of Ser. No. 07/954,372 filed Sep. 30, 1992, now abandoned.

DESCRIPTION

1. Technical Field

This invention relates to a finished forged toothed sprocket segment having spaced datum pads, and an apparatus and method for forging the toothed sprocket segment to a preselected finished size and shape.

2. Background Art

Toothed sprocket segments for track type vehicles have been in existence for decades. A plurality of toothed sprocket segments are consecutively mounted on each driven hub of a track type vehicle to form a continuous ring of teeth about the hub. The sprocket teeth are engageable with tracks on the vehicle and cause the tracks to travel relative to the hub in response to rotation of the hub.

Toothed sprocket segments are normally forged in a pair of separable dies and then machined to a finished shape. Over the years efforts have been made to reduce the amount of machining of the toothed sprocket segment in order to cut manufacturing time and cost. These efforts have been successful, however, there remains to date machining operations that have not been eliminated. For example, one surface requiring machining is a first curved side of a rim of the toothed sprocket segment. The first curved side surface engages the outer circumferential surface of the hub. This locates the toothed sprocket segment radially relative to the center of rotation of the hub.

As disclosed in U.S. Pat. No. 4,517,819 to Gianni Sandtoni, dated May 21, 1985, a method and apparatus is disclosed for forging a finished toothed sprocket segment from a rough-shaped blank. The apparatus and method disclosed requires first and second die halves and a coining die to facilitate the forming of a finished toothed sprocket segment from a rough-forged segment. This apparatus does reduce the amount of machining required but is only applicable for forging finished toothed sprocket segments of a limited size and shape, three teeth or less. It is not feasible to coin the teeth in the direction shown for sprocket segments of a length greater than shown or with a number of teeth more than three.

The addition of the coining die portion adds complexity to the forging apparatus and operation and provides locations on the finished toothed sprocket segment where flash may develop. Since the finished toothed sprocket segment is forged in the first and second die halves, a parting line and flash will form on the toothed sprocket segment at the juncture of engagement between the first and second die halves. Removal of the flash at the ends of the arcuate length of the sprocket segment by grinding is required to enable the segments to fit on the hub. This increases the time of manufacture of the segmented sprocket. Further, mismatch of the first and second die halves during forging will adversely effect the accuracy of the finished toothed sprocket segment. Should the mismatch be greater than that allowed by an established tolerance range the segment will be unusable.

The sprocket segments, in order to be accurately and squarely mounted on the hub, require that certain accurate conditions are maintained. For example, the curved surface of the rim and the first side of a sprocket flange adjacent the rim curved surface should be square with each other so that the sprocket segments are true and do not wobble during rotation of the hub about its axis of rotation. It is also preferable that a second side of the flange opposite the flange first side be parallel to the first side and flat so that the bolts mounting the flange on the hub securely retain the toothed sprocket segments on the hub and from inadvertent loosening. It is also important that the length of the curved rim be accurately controlled so that the toothed sprocket segments may be mounted closely adjacent to each other and without an excessive clearance gap at the ends of the sprocket segment. This improves fit up of the segments on the hub and provides for a better quality sprocket assembly. Today at least one or more of the above discussed requirements are achieved by machining after forging which increases the time and cost of the sprocket segments.

At present the forging dies which part between first and second opposite sides of the rim require a draft angle so that the toothed sprocket segment being forged may be easily removed from the dies. As one may perceive, any extra draft material provided on a critical surface must be machined away in order to be conform to the tolerances specified and to be square, flat and parallel where required.

Subsequent to final machining the toothed sprocket segments are heat treated to achieve the desired physical properties. This heat treatment may cause distortion of the finished toothed sprocket segment which affects the fit-up on the hub. The fit up problem is most significant in the area between the first curved side of the rim of the sprocket segment and the circumference of the hub. The radius of the circumference of the hub and the radius of curvature of the first curved side are substantially identical. Therefore, ideally, the first curved side mates with the circumference of the rim along the full length of the curved surface. Any change in the radius of curvature of the curved surface will affect alignment of the mounting bolt holes in the flange and hub and make it difficult to assemble the toothed sprocket segment on the hub. It is also evident that the change in the radius of curvature will affect the distance between the opposite ends of the rim and thus the spacing between adjacent rim ends. Should the rim length increase, interference between adjacent toothed sprocket segments may occur and prevent assembly of the toothed sprocket segment on the hub.

The present invention is directed to overcoming one or more of the problems as set forth above.

DISCLOSURE OF THE INVENTION

In one aspect of the present invention, a forged toothed sprocket segment of unitary construction comprises an elongated flange having first and second spaced sides, an elongated rim having first and second spaced sides, first and second spaced curved sides oriented transverse the first and second rim sides, and a plurality of equally spaced apart teeth extending from the second curved side. The elongated flange is connected to and extends from the first curved side in a direction opposite the direction of extension of the teeth. First and second datum pads are connected at longitudinally spaced locations to the first curved side of the elongated rim on the first side of the elongated flange.

A method for forging a unitary, one piece, finished toothed sprocket segment to a preselected shape and size is provided. The finished toothed sprocket segment has a flange, an elongated rim, and a plurality of equally spaced teeth each having a tip. The flange has first and second spaced substantially parallel sides. The elongated rim has first and second spaced curved sides and first and second spaced sides. The plurality of equally spaced teeth are connected to the second curved side of the flange. A plurality of spaced datum pads are located on the first curved side of the finished toothed sprocket segment and on the first side of the flange. The method comprises the steps of forming a metal billet of a preselected mass to a rough-shaped blank. Forging the blank in a die set having a first and second dies. The first die having a cavity defining a configuration of the finished toothed sprocket segment on a first side of a parting surface of the finished toothed sprocket segment, and the second die having a protrusion defining the configuration at the parting surface of the finished tooth sprocket segment. The parting surface being defined by the second side of the flange, the second side of the elongated rim, and the first curved side of the elongated rim located between the second side of the flange and elongated rim. The finished tooth sprocket segment is formed entirely within the first die cavity. Removing the finished tooth sprocket segment from disposition in the cavity of the first die.

An apparatus for forging a finished toothed sprocket segment to a desired shape and size is provided. The finished toothed sprocket segment has a flange, an elongated rim, first and second spaced ends defining the length of the elongated rim, and a plurality of equally spaced apart teeth. The flange has first and second spaced sides and an edge. The elongated rim has first and second spaced sides and first and second curved sides oriented transverse to the elongated rim first and second sides. The flange is connected to the elongated rim first curved side and the teeth are connected to the elongated rim second curved side. The flange and teeth extend in opposite directions. The apparatus comprises a first die having a body, a stop surface and a cavity disposed in the body and opening at the stop surface. The cavity has a stepped end surface and a side surface. The stepped end surface of the cavity defines the first side of the flange, the first side of the elongated rim, and the first curved surface of the elongated rim. The side surface of the first die is substantially perpendicular to the stop surface of the first die. The side surface of the first die defines the teeth, the first and second ends, and the edge of the finished toothed sprocket segment. A second die has a body, a stop surface on the body and a protrusion extending from the stop surface. The protrusion has a side surface and a stepped end surface. The side surface of the protrusion is substantially perpendicular to the stop surface of the second die. The second die is movable relative to the first die between a first position at which the first and second die stop surfaces are spaced from each other and a second position spaced from the first position at which the first and second die stop surfaces are engaged with each other. The protrusion is disposed in the cavity of the first die at the second position of the second die. The stepped end surface of the second die defines a parting surface of the toothed sprocket sprocket segment within the cavity of the first die during forging. The parting surface defines the first side of the flange and elongated rim of the finished toothed sprocket segment.

Since the finished toothed sprocket segments are formed entirely in the cavity of the second die, the parting of the first and second dies occurs on the second side of the flange and rim. As a result no intermediate parting line develops on the toothed sprocket segment which could affect the operation of the finished toothed sprocket segment as applied to the operation of the sprocket segment on the hub.

Sealing engagement between the protrusion of the second die and the cavity of the first die prevents flash frown being formed and thus eliminates the need for subsequent machining.

Since the finished toothed sprocket segments are formed entirely within the cavity of the first die all critical dimensions are held within prescribed tolerances. Thus, unlike dies in which the toothed sprocket segment is formed in both halves, relationships such as, parallelism, squareness, flatness and the like are, maintainable.

The plunger, which is provided to eject the finished toothed sprocket segment from the first die, in combination with the forming of the finished toothed sprocket segment in the first die, eliminates the need to provide draft on the side of the first and second dies. Surfaces of the toothed sprocket segment normally requiring draft and finish machining or coining can now be forged to finished specifications. Thus, a substantial amount of machining and coining is eliminated.

The provision of the first and second spaced datum pads on the first curved side of rim of the finished toothed sprocket segment provides two raised locations on the sprocket segment which engage the rim of the hub to which the segment is to be mounted. Since the first and second raised datum pads contact the circumference of the hub and maintain the first curved side of the finished toothed sprocket segment from contacting the hub the tight tolerances of the first curved surface may be lessened as the first curved surface is no longer a critical locating surface. Thus, manufacture of the finished toothed sprocket segment is made simpler and less expensive.

The first and second datum pads, a location on the tip of one of the teeth, and three spaced locations on the first side of the flange provide locators for the aperture machining operation. Since these locations are accurately forged, the locations of the machined apertures relative to the first and second datum pads are accurately maintained. As a result fit-up of the finished forged sprocket segment on the hub is accurate.

BRIEF DESCRIPTION OF THE DRAWINGS

FIG. 3 is a diagrammatic cross section view of an apparatus for forging a finished toothed sprocket segment and a finished toothed sprocket segment;

FIGS. 4–12 discloses a series of isometric views showing the steps of the method for forging a finished toothed sprocket segment.

BEST MODE FOR CARRYING OUT THE INVENTION

Figure 1:
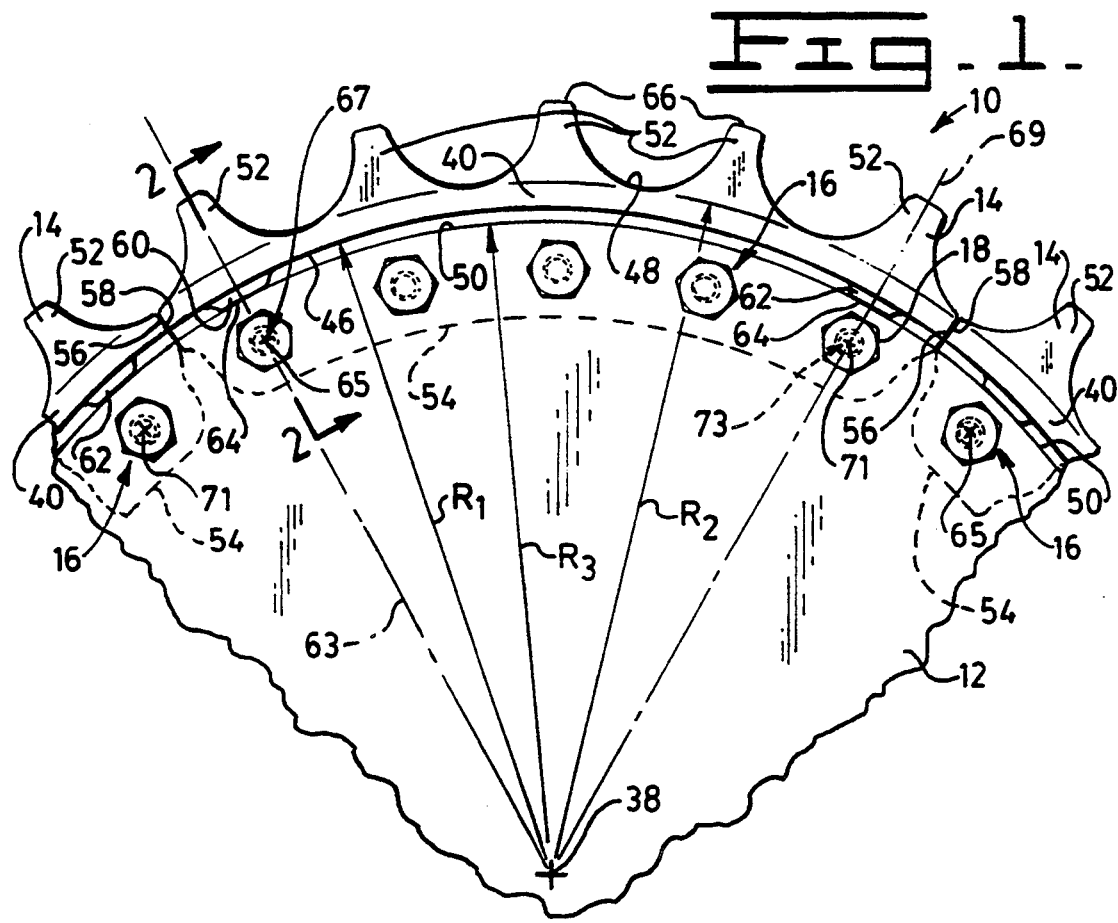
FIG. 1 is a diagrammatic side plan view of an embodiment of the present invention showing a sprocket assembly for a track type vehicle.
Figure 2:
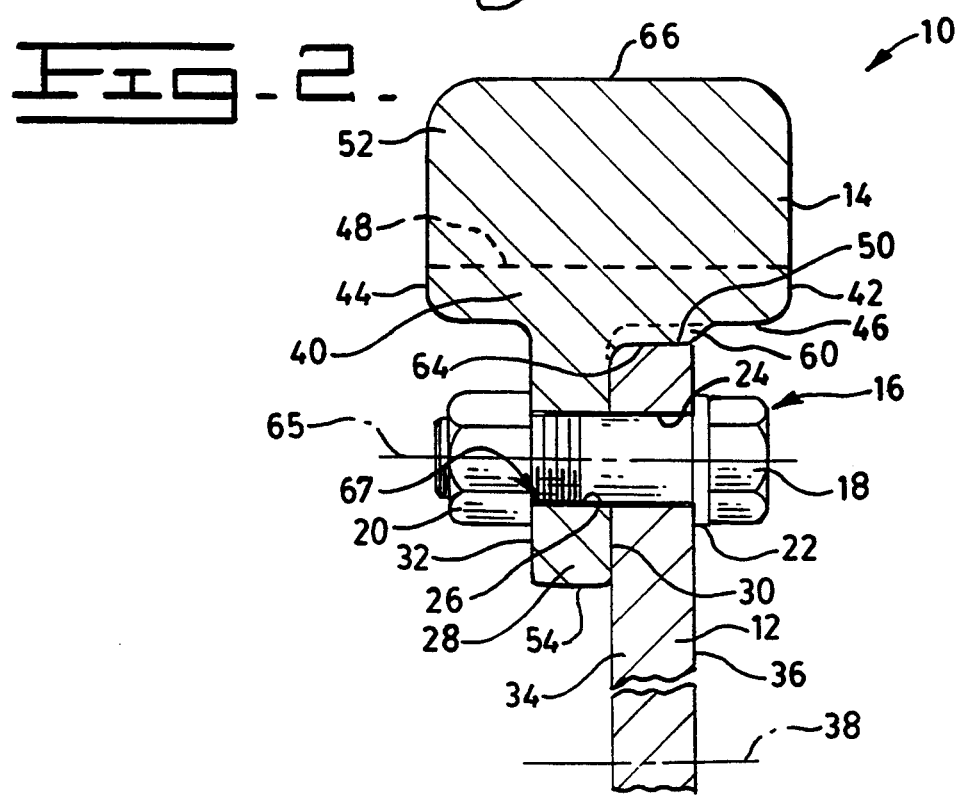
FIG. 2 is a diagrammatic cross section view taken along lines 2—2 of FIG. 1.

With reference to the drawings, and particularly FIGS. 1 and 2, a partial view of a sprocket assembly 10 is disclosed. The sprocket assembly 10 includes a hub 12 and a plurality of finished toothed sprocket segments 14 connected to the hub 12 by a plurality of fasteners 16. The fasteners 16 are shown as having a threaded bolt 18 backed by a washer 22 and a nut 20 screw threadably connected to the bolt 18. It is to be noted that other types of fasteners such as studs, rivets and the like are considered equivalents and within the spirit of the invention. The fasteners 16 are disposed in a plurality of aligned apertures 24,26 in the hub 12 and a flange 28 of the sprocket segments 14. The apertures 26 extend through the flange 28 and open at first and second opposed sides 30,32 of the flange 28. The apertures 24 extend through the hub 12 and open at first and second sides 34,36 of the hub 12. The apertures 24,26 are substantially axially normal to the first sides 30,34, respectively, and parallel to the axis of rotation 38 of the hub 12 as assembled.

The finished toothed sprocket assembly 14 has a rim 40 which is elongated and curved. The rim 40 has first and spaced second sides 42,44. The sides are substantially flat and preferably parallel to each other. The rim 40 also has first and second spaced curved cylindrical sides 46,48. The curved sides 46,48 are generated by a radius of curvature $R^1$, $R^2$, respectively, of a preselected length about the axis 38. The length of the radius of curvature $R^1$ of the first curved side 46 is a function of the radius $R^3$ of a circumferential supporting surface 50 of the hub 12 less a preselected radial clearance distance. The length of the radius of curvature $R^2$ of the second curved side 48 is a function of the root depth of the sprocket teeth 52 and the required strength of the sprocket segment 14. The first curved side 46 is substantially parallel to the second curved side 48.

The flange 28 is connected to the first curved side 46 between the first and second rim sides 42,44, extends toward the axis 38, and terminates at an edge 54. In particular, the first and second flange sides 30,32 are substantially flat, preferably parallel to each other, perpendicular to the first curved side 46, and parallel to the rim first and second sides 42,44. The edge 54 is preferably curved and generated by a radius about axis 38.

The teeth 52 are connected to extend radially from the rim second curved side 48 in a direction opposite the direction of extension of the flange 28. The teeth are equally spaced apart and preferably number five (5) teeth per sprocket segment. The rim 40 and the flange 28 terminate at first and second spaced ends 56,58 which defines the extremes of elongation of the finished toothed sprocket segment. The first and second ends 56,58 are each defined by a radial plane lying along the axis 38 and passing through the ends 56,58. The sprocket teeth 52 lie along the second curved side 48 and between the first and second ends 56,58. The first and second datum pads 60,62 are connected at spaced locations to the first curved side 46 of the rim 40. The first and second datum pads are located between the first and second sides 42,44 of the rim 40 and the first side 30 of the flange 28. The first and second datum pads 60,62 extend radially from the first curved surface 46 toward the axis 38 a distance equal in magnitude to the preselected clearance distance, the difference between $R^1$ and $R^3$, and terminate in a substantially rectangularly shaped raised side 64. The first and second datum pads 60,62 are connected to the first side 30 of flange 28. The raised surfaces 64 are preferably curved and defined by a radius pivoted about axis 38. The surfaces 64 are substantially perpendicular to the first side 30 of the flange 28. The sprocket teeth 52 each have an elongated tip 66.

The tips 66 are substantially parallel to each other, parallel to the first curved surface 46, and parallel the surface 64 of the datum pads 60,62.

The first and second datum pads 60,62 may extend to the first and second ends 56,58, respectively, of the elongated rim 40 or may be spaced a preselected distance from the first and second ends 56,68, respectively, of the elongated rim 40. The exact location is a function of the flow characteristics of the material being forged. Preferably, the first and second datum pads 60,62 are equally spaced frown the first and second ends 56,58, respectively. As best seen in FIG. 1, the first datum pad 60 lies along a first straight line 63 extending from the axis 38 and through an axis 65 of a first aperture 67 of the flange apertures 26. The second datum pad 62 lies along a second straight line 69 extending from the axis 38 and through an axis 71 of a second aperture 73 of the flange apertures 26. As shown in FIG. 1, the first and second lines 63,69 preferably bisect the surfaces 64 of the first and second datum pads 60,62.

The raised surfaces 64 of the first and second datum pads 60,62 are engaged with the supporting surface 50 of the hub 12 at spaced apart locations on the supporting surface 50. The raised surfaces 64 support the finished toothed sprocket segments 14 on the hub 12 and facilitate alignment of the plurality of flange apertures 26 with the hub apertures 24. The accurate positioning of the sprocket segments 14 as provided by the datum pads 60,62 and apertures 26 insures that proper spacing of the sprocket segments 14 about the circumference of the hub 12 is maintained. The apertures 26 are located relative to the datum pads 60,62 and a datum point on one of the teeth tips 66.

The first and second datum pads 60,62, the first side 30 of the flange 28, and a location on a tip 66 of a center one of the teeth define "Y", "X", and "Z" functional datums for locating the finished toothed sprocket segment for machining of the apertures 26.

With reference to FIG. 3, an apparatus 68 for forging the finished toothed sprocket segment 14 to a desired shape and size is shown. The apparatus 68 has a first die 70. The first die has a body 72, a stop surface 74, and a cavity 76 disposed in the body 72 and opening at said stop surface 74. The cavity 76 has a stepped end surface 78 and a side surface 80. The stepped end surface 78 of the cavity 76 defines the first side 30 of the flange 28, the first side 42 of the elongated rim 40, and the first curved side 46 of the elongated rim 40. The side surface 80 is substantially perpendicular to the stop surface 74 of the first die 70. The side surface 80 defines the configuration of the teeth 52, the first and second ends 58, and the edge 54 of the flange 28 of the finished toothed sprocket segment 14.

The apparatus 68 also has a second die 82. The second die has a body 84, a stop surface 86 on said body 84, and a protrusion 88 extending from the stop surface 86. The protrusion 88 has a side surface 90 and a stepped end surface 92. The side surface 90 is substantially perpendicular to the second die stop surface 86. The second die stop surface 86 is movable relative to the first die 70 between a first position at which the first and second die stop surfaces 74,86 are spaced from each other and a second position spaced from the first position at which the first and second die stop surfaces 74,86 are engaged with each other. The protrusion 88 is disposed within the cavity 76 of the first die 70 at the second position of the second die 82 and during a portion of the movement from the first position to the second position. The second die stepped end surface 92 defines a parting surface 94 with the finished toothed sprocket segment 14 in the cavity 76 of the first die 70 during forging. The parting surface 94 defines the flange second side 32, the elongated rim second side 44, and the first curved side of the elongated rim 46 located between the flange second side 32 and the second side 44 of the elongated rim 40.

A press having a ram (all not shown) moves the second die 82 relative to the first die 70 and between the first and second relative positions. The ram is preferably fluid operated and engaged with the first die 70. For the purpose of this invention presses other than fluid operated ones are considered equivalent and suitable for use in this application. The particular press selected must have the capability of applying a selected pressure so that, in one embodiment of the invention, the thickness of the flange 28 and rim 40, in a direction between the first and second sides 30,32,42, and 44 varies as a function of the mass of the blank being forged. Since presses of this type are well known in the art no further discussion will be provided.

The side surface 90 of the protrusion 88 is slidably engageable with the side surface 80 of the cavity 76 during movement between the first and second positions. The side surface 90 of the protrusion 88 is preferably in sealing engagement with the side surface 80 of the cavity 76. Sealing engagement between side surfaces 80 and 90 eliminates material from extruding and flash from forming.

First and second spaced recesses 96,98 are disposed in the cavity 76 and define the first and second spaced apart raised datum pads 60,62 on the first curved side 46 of the elongated rim 40 between the first side 30 of the flange 28 and the first side of the rim 40. The first and second spaced recesses 96,98 are a preselected distance apart and define a preselected distance of the first and second raised datum pads 60,62 from the first and second ends 56,58, respectively, of the elongated rim 40.

The first and second recesses 96,98 each have a depressed surface 100 defining the raised surface 64 on the first and second datum pads 60,62. The depressed surface 100 is substantially perpendicular to the stepped end surface 78 of the cavity 76 so that the raised surface 64 is perpendicular to the first side surface 30 of the flange 28. Preferably, the depressed surface 100 is also substantially parallel to the side surface 80 of the cavity 76. The stepped end surfaces 92,78 of the protrusion 88 and cavity 76 are preferably maintained parallel to each other during sliding movement of the protrusion 88 in the cavity and at the second position of the second die 82. The stepped end surfaces 92,78 establish the first and second flange sides 30,32 and the first and second rim sides 42,44 as being parallel.

The forging apparatus 68 has an ejector 106 connected to the first die 70. The ejector 106 ejects the finished toothed sprocket segment 14 from being fully disposed within the cavity 76 in the first die 70. The ejector 106 includes a plunger 102 disposed in a bore 104 in the first die 70. The bore 104 opens in the cavity 76 and the plunger 102 is movable in the bore 104 to engage the toothed sprocket segment 14 and force the toothed sprocket segment 14 from disposition in the cavity 76. The plunger 102 is powered for movement in any suitable and conventional manner such as, electrically, mechanically, or hydraulically.

Referring to FIGS. 4–12 the steps required to manufacture the above identified finished toothed sprocket segment 14 with the forging apparatus 68 are generally disclosed. As shown in FIG. 4, the first step involves the activity of cutting a metal billet 108 from bar stock 110 having a preselected size and shape to a preselected length with a shear 112. The mass of the billet 108 is substantially equal in magnitude to the mass of the finished forged sprocket segment 14. Other techniques for cutting the bar stock 110 such as, flame cutting, sawing, and the like are considered to be suitable substitutes and within the scope of the invention.

As shown in FIG. 5, the next step involves heating the metal billet 108 in a first furnace 114, for example, an electric induction furnace, for a preselected period of time, and at a preselected temperature. The temperature and time selected is a function of, for example, the material composition and the mass of the metal billet 108 being forged.

The next step, as shown in FIG. 6 involves the process of rough forming the metal billet 108 in a rough die set 116 of any suitable conventional design to a rough-shaped blank 118, as shown in FIG. 7. The rough-shaped blank 118 has substantially the same mass as the billet 108 end requires no flash removal.

As shown in FIG. 8, the next step includes placing the rough-shaped blank 118 in the cavity 76 of the first die 70 of a finish die set 120 of the forging apparatus 68. The finish die set 120 includes the first and second dies 70,82 and the ejector 106. The cavity 76 is larger in dimensions than the rough-shaped blank 118 so that the entire blank 118 fits within the cavity 76. After the rough-shaped blank 118 is placed in the cavity 76 the next step involves moving of the second die 82 from the first position toward the second position. The rough-shaped blank 118 is engaged by the second die 82 as the second die 82 moves toward the second position. Forcing of the blank 118 into engagement with the first die cavity 76 and the forming of the finished toothed sprocket segment 14 within the cavity 76 occurs as a result of this movement. Note that the finished toothed sprocket segment 14 is formed on one side of the parting surface 94 within the cavity 76, and the stepped end surface 92 of the second die protrusion 88 defines the configuration of the finished toothed sprocket segment 14 at the parting surface 94 of the finished tooth sprocket segment 14.

In applications where the protrusion side surface 90 is matingly sealingly engageable with the cavity side surface 80 the mass of the rough-shaped blank 118, as compared to the volume of the cavity 76, will define the thickness of the flange 28 and the elongated rim 40 of the finished toothed sprocket segment 14 in a direction between the first and second sides 42,44 of the elongated rim 40. The tolerance of the mass of the rough-shaped blanks 118 permits a variation in the thickness of the flange 28 and elongated rim 40 between finished toothed sprocket segments 14. Forging of the rough-shaped blank 118 into a finished toothed sprocket segment 14 will be completed when movement of the second die 82 relative to the first die 70 ceases, such as, when the force of the ram applied to the second die 82 reaches a preselected maximum value. In this particular example the mass of the rough-formed blank 118 and the volume of the cavity 76 are the controlling factors in determining the position of stop surface 86 relative to the stop surface 74. Thus, the stop surfaces 74,86 will be spaced apart when the finished toothed sprocket segment 14 is forged to the final configuration.

In applications where a clearance space is provided between the cavity side 80 and the protrusion side 90 excessive rough-formed blank material enters into the clearance space during movement of the second die 82 toward the second position. In this embodiment the stop surfaces 74,86 define the second position of the first and second dies 70,82, the position at which the finished toothed sprocket segment 14 is formed, the second position of the first and second dies 70,82. Thus, movement of the second die 82 relative to the first die 70 will cease when the stop surfaces 74,86 are engaged with each other.

Subsequent to the finished toothed sprocket segment 14 being formed the ram is actuated and moves the second die 82 from the second position to the first position. At this position the first and second dies 70,82 are spaced a sufficient distance apart to permit removal of the finished toothed sprocket segment 14 from the first die 70.

As best seen in FIG. 3, the finished tooth sprocket segment 14 is displaced from being disposed in the cavity of the first die 70 by ejector 106. The use of the ejector 106 and the forming of the finished toothed sprocket segment 14 within the first die 70 makes it possible to form the sides 30 and 42 parallel to each other, the edge 54, protrusion surface 64, first and second curved sides 46,48 and tip 66 parallel to each other, and perpendicular to the sides 30,42. Thus, the finished toothed sprocket segments 14 may be formed without any draft.

The ejector 106 ejects the finished toothed sprocket segment 14 from cavity 76 by moving the plunger 102 toward the finished toothed sprocket segment 14 (FIG. 9). It is to be noted that the ejector 106 may include a plurality of plungers each engageable with the finished toothed sprocket segment 14 at spaced locations on the first sides 42 and 30.

As shown in FIG. 10, the plurality of spaced apertures 26 are machined through the flange 28 by a machine tool (not shown) having a plurality of spaced drill bits 126. The first aperture 67, of the plurality of apertures 26, is machined through the flange 28 at a first location on the flange lying along a first line 63 passing through an axis of rotation 38 of the radius of generation of the first curved side 46 and the first datum pad 60. The second aperture 73, of the plurality of apertures 26, is machined through the flange 28 at a second location on the flange 28 spaced from the first location lying along a second line 69 passing through the axis of rotation 38 of the radius of generation of the first curved side 46 and the second datum pad 62.

Machining of the plurality of spaced apertures 26 through the flange 28 of the finished toothed sprocket segment 14 is preceded by locating the finished toothed sprocket segment 14 relative to the drill bits 126. This locating is achieved by a fixture (not shown) of any suitable design which engages the datum pads 60,62, the first flange side 30, and the tip 66 of one of the teeth 52. Positioning the finished toothed sprocket segment 14 by the above noted locators enables accurate machining of the first aperture 67 through the flange at a desired first location on the flange 28 adjacent the first datum pad 60 and accurate machining of the second aperture 73 through the flange at a second location on the flange spaced from the first location on the flange 28 and adjacent the second datum pad 62. It is desirable to have the first and second apertures 67,73 close to the first and second datum pads 60,62, respectively, so that any slight amount of variation in the curvature of the finished toothed sprocket segment 14 will not affect connection of the sprocket segment 14 to the hub 12.

As shown in FIG. 11, the finished toothed sprocket segment 14 is heat treated after the drilling operation in an induction heater 122 and then quenched after heat treatment by submersion in tank 124. Any distortion of the finished toothed sprocket segment 14 caused by final heat treatment will not affect fit-up on the hub 12 as the first and second datum pads 60,62 are raised and prevent interference between the first curved side 46 of the rim 40 and the supporting surface of the hub 50.

Industrial Applicability

With reference to the drawings, the finished toothed sprocket segment 14 is accurately forged to final dimensions in the finish die set 120 by the forging apparatus 68. Since the finished toothed sprocket segment 14 is entirely forged in the cavity of the first die 70 it is possible to closely hold the tolerances of the sprocket segment 14 and eliminate the need for subsequent final machining of the critical surfaces. This capability includes, for example, maintaining the sides 30,32,42,44 parallel to each other, the sides 46,48, tip 66 and edge parallel to each other, and the sides 46,48, tip 66 and edge square with the aforementioned sides 30,32,42,44. Thus, the draft angle normally associated with forged sprocket segments is eliminated.

In applications where the side surface 90 of the protrusion 88 is slidably and substantially sealingly engageable with the side surface 80 of the cavity 76 no flash build up will form. Since the stepped end surface 92 of the protrusion 88 defines the die parting surface 94 between the first and second dies 70,82 no parting line will be established on the finished toothed sprocket segment 14 thus eliminating the need for coining. Since the entire sprocket segment 14 is formed within the cavity 76 and the protrusion 88 is disposed in the cavity 76 during forging no mismatch between the first and second dies 70,82 will occur.

In applications where a clearance space is provided between the side surface 90 of the protrusion 88 and the side surface 80 of the cavity 76 flash may occur. Since the location of the flash extends normally from the second side 32 of the flange 28, a non critical location, it will not interfere with the operation or mounting of the finished toothed sprocket segment 14. Therefore removal of the flash by grinding is optional.

Forging of the first and second datum pads 60,62 on the first curved side 46 of the rim 40 enables the finished toothed sprocket segment 14 to make two point contact with the machined supporting surface 50 of the hub 12. This eliminates the problems associated with locating the first curved side 46 on the supporting surface 50. Distortion of sprocket segments during final heat treatment makes it difficult to locate the segment when the first curved side 46 is the primary locator of the sprocket segment. Since the apertures 26, particularly the first and second apertures 67,73, are positioned relative to the first and second datum pads 60,62 the effects of distortion of the finished toothed sprocket segment 14 caused by final heat treatment will be minimized. Thus, alignment between the apertures 24 and 26 will be easily achieved during fastening of the finished toothed sprocket segment 14 on the hub 12.

Because the second side 32 of the flange 28 is maintained flat and without draft there is no need to spot face by machining or provide special tooling to forge flat areas at the locations of the apertures 26. Thus, the fasteners 16 will bear squarely against the second side 32 and without cocking or side loading.

Other aspects, objects and advantages of the present invention can be obtained from a study of the drawings, the disclosure and the appended claims.

We claim:

1. A forged toothed sprocket segment of unitary construction, comprising:

an elongated flange having first and second spaced sides;

an elongated rim having first and second spaced sides, first and second spaced curved sides oriented transverse the first and second rim sides, and a plurality of equally spaced apart teeth extending from the second curved side, said elongated flange being connected to and extending from the first curved side in a direction opposite the direction of extension of said teeth;

first and second datum pads connected at longitudinally spaced locations to the first curved side of the elongated rim, said first and second datum pads being on the first side of the elongated flange.

2. A forged toothed sprocket segment, as set forth in claim 1, wherein said elongated rim having first and second spaced ends defining a preselected elongated rim length, said first and second datum pads each being spaced a preselected distance from the first and second ends, respectively, of the elongated rim.

3. A forged toothed sprocket segment, as set forth in claim 1, wherein said first curved side being defined by a radius of curvature (R1) generated from a curvature axis spaced a preselected distance from said first curved side, said elongated flange having first and second spaced apertures opening on the first and second sides of the elongated flange, said apertures each having an axis, said first datum pad lying along a first line extending from said curvature axis and through the axis of the first aperture, said second datum pad lying along a second line extending from said curvature axis and through the axis of the second aperture.

4. A forged toothed sprocket segment, as set forth in claim 3, wherein said elongated rim having first and second ends defining a predetermined elongated rim length and said first and second datum pads being equally spaced from the first and second ends, respectively.

5. A forged toothed sprocket segment, as set forth in claim 2, wherein said first and second datum pads have a raised surface spaced a preselected distance from the first curved side of the elongated rim.

6. A forged toothed sprocket segment, as set forth in claim 5, wherein said raised surface of each datum pad being substantially rectangular.

7. A forged toothed sprocket segment, as set forth in claim 5, wherein said first and second datum pads being connected to the first side of the elongated flange.

8. A forged toothed sprocket segment, as set forth in claim 7, wherein said elongated flange being located between the first and second sides of the elongated rim.

9. A forged toothed sprocket segment, as set forth in claim 2, wherein said first and second spaced sides of the elongated rim being substantially parallel to each other and to the first and second sides of the elongated flange.

10. A forged toothed sprocket segment, as set forth in claim 5, including a parting surface defined by the second side of the elongated rim and flange, and said first curved side of the elongated rim located between the second side of the elongated flange and the second side of the elongated rim.

11. A forged toothed sprocket segment, as set forth in claim 5, wherein said raised surface of the first and second datum pads being substantially perpendicular to the first side of the flange.

12. A forged toothed sprocket segment, as set forth in claim 11, wherein said first curved side of the elongated rim being substantially perpendicular to the first side of the flange.

13. A forged toothed sprocket segment, as set forth in claim 12, wherein said flange having an edge and said teeth each having a tip, said flange edge and said tip being substantially parallel to each other in a direction of elongation of the tip.

14. A forged toothed sprocket segment, as set forth in claim 5, wherein said plurality of teeth include five teeth.

15. A forged toothed sprocket segment, as set forth in claim 1, including first and second spaced ends defining the length of said elongated rim, said first and second datum pads being located on the first curved side at the first and second ends, respectively, and said first and second datum pads each having a raised surface spaced from the first curved side.

16. A forged toothed sprocket segment, as set forth in claim 5, including:

a hub having a supporting surface, said raised surface of the first and second datum pads being engaged with the supporting surface at spaced locations on the supporting surface, said first curved side being spaced from said supporting surface; and means for fastening the flange to said hub and maintaining said first and second datum pads in engagement with the hub.

* * * * *